March 10, 1942. H. E. SLOAN ET AL 2,275,828
CHUCK
Filed Nov. 27, 1939
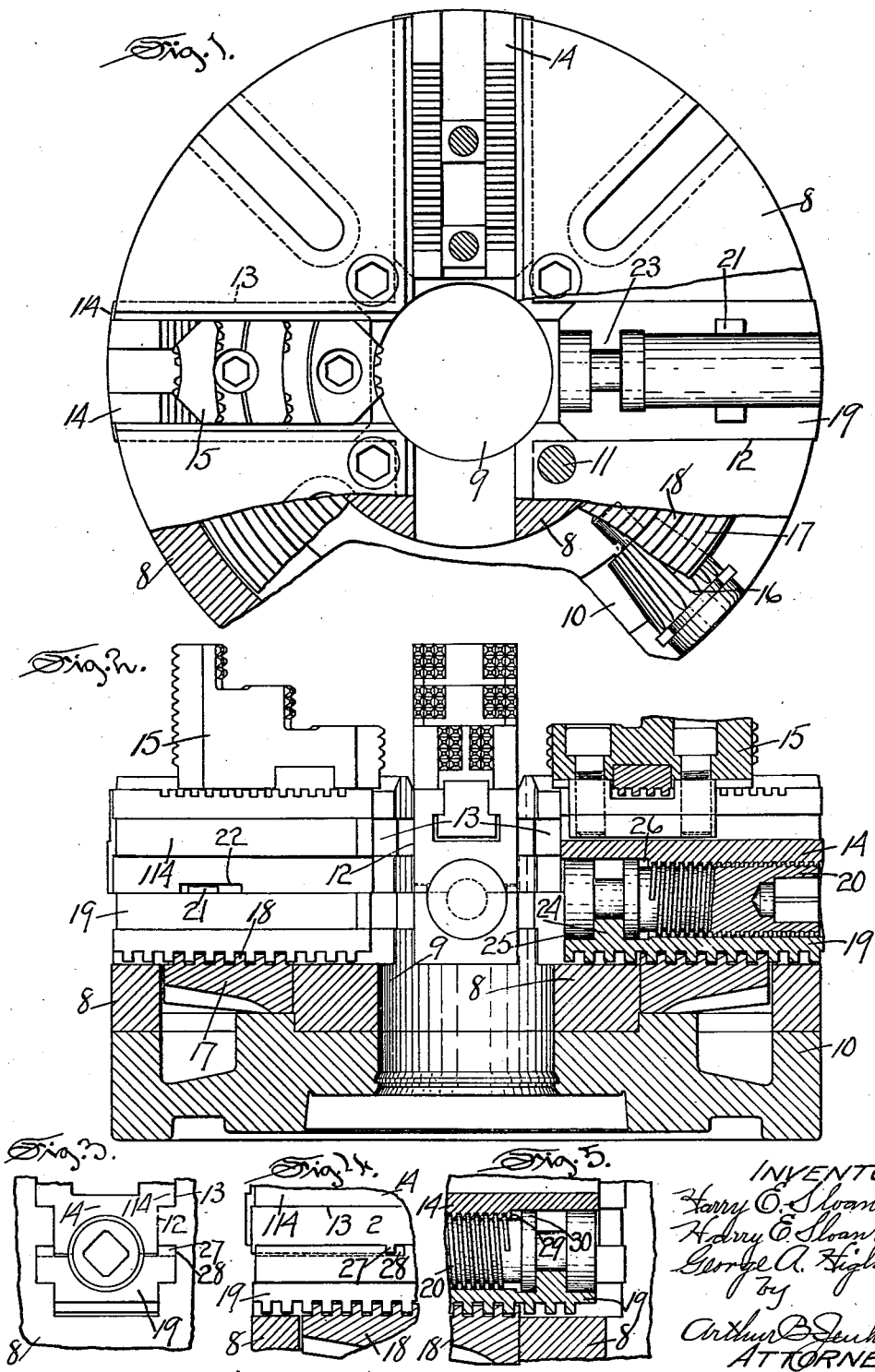

Patented Mar. 10, 1942

2,275,828

UNITED STATES PATENT OFFICE 2,275,828

CHUCK

Harry E. Sloan and Harry E. Sloan, Jr., Hartford, and George A. Highberg, West Hartford, Conn., assignors to The Cushman Chuck Company, Hartford, Conn., a corporation of Connecticut Application November 27, 1939, Serial No. 306,276

3 Claims. (Cl. 279—116)

Our invention relates more especially to that class of chucks embodying a plurality of chuck jaws supported upon a face plate and movable radially thereon as by means of a scroll ring rotatably mounted in the chuck body, and an object of our invention, among others, is to provide a chuck of this class having means whereby the position of the chuck jaws may be relatively changed and particularly having means to positively determine when the chuck jaws are relatively concentrically placed in the same positions on the chuck body.

One form of a chuck embodying our invention and in the construction and use of which the objects herein set out, as well as others, may be attained is illustrated in the accompanying drawing, in which—

Figure 1 is a face view of a portion of a chuck embodying our invention with parts broken away to show construction.

Figure 2 is a view generally in central section on a plane passing through the axis of the chuck, one of the chuck jaws being shown in full and other parts being broken away to show construction.

Figure 3 is a view of a fragment of the chuck showing a modification, this being an end view.

Figure 4 is a side view showing this modification.

Figure 5 is another fragmental view showing another modification.

In the use of chucks of this type herein illustrated and described it is often desired to hold pieces of work of irregular shapes, in which the jaws are required to be placed at different distances from the axis of the chuck, this in order to grip the irregularly shaped pieces. After the jaws have been moved for the purpose mentioned, or for any other purpose, it is of the utmost importance that they be replaced so that they are all concentric with respect to the axis of the chuck, this in order that true pieces of work may be accurately centered. It is desirable that in concentrically positioning the chuck jaws as just explained it may be positively and certainly determined when the jaws are in such concentric positions. The present invention is therefore for the purpose of definitely and positively fixing the position of the chuck jaws with certainty concentrically with the chuck body.

Such a chuck embodying this invention is illustrated in the drawings herein in which the numeral 8 denotes a chuck body having a central opening 9 and a back plate 10 that is secured to the body in any usual manner, as by means of screw bolts. Screw bolts 11 are also used to secure the chuck to its spindle. The body is provided with any suitable number of radial grooves 12, in the structure herein shown four of these grooves being employed and which extend from the outer edge of the chuck into the opening 9, and the opposite walls of each of these grooves are provided with slots 13 fitting ribs 114 along the sides of master jaws 14 which are adapted to support work holding jaws 15 in a manner common to chucks of this type and which will be readily understood.

A pinion or pinions 16 is or are mounted in the body of the chuck, each pinion having means, as an opening of angular shape in cross section, to receive a tool of similar shape by means of which the pinion may be turned. These pinions are bevel pinions, their teeth meshing with the teeth on the under side of a scroll ring 17 rotatably mounted on the chuck body and having a thread or threads arranged in the form of a scroll 18 to engage similarly threaded under surfaces of screw carriers 19 slidably engaged in the grooves 12.

The bottom of each of the master jaws 14 has a threaded recess opening opposite an unthreaded recess in the top of each of the screw carriers 19, said combined recesses providing holes to receive jaw adjusting screws 20 each of which screws is threadedly engaged with the threaded side of said hole, as shown in Fig. 2 of the drawing. The screw carriers 19 are interengaged with the master jaws 14 as by means of lugs 21 on opposite sides of the screw carriers entering recesses 22 on opposite sides of the bottoms of the master jaws 14, the lugs being smaller than the recesses so that a limited movement of the master jaws independently of the screw carriers is provided. The adjusting screws 20 are employed for this purpose so that the jaws may be independently moved to properly position them to grip pieces of work of irregular shapes and whereby such jaws are required to be located at different distances from the axis of the chuck so that grip upon the piece of work may be had by all of the jaws.

As hereinbefore stated, after the jaws have been moved from concentric positions it is desirable that they may be replaced in concentric positions with certainty and with as little trouble as possible. The coacting shoulders at opposite ends of each of the recesses 22 and at opposite sides of each of the lugs 21 enable this to be done without limiting the capacity of the chuck, the screws 20 simply being turned until said coacting shoulders abut one another either outwardly or inwardly, in which positions it will be assured that the jaws will be concentrically placed on the chuck body.

As an example, referring to Figure 2 and the chuck jaw structure at the left thereon, assuming that the contacting shoulders on the lug 21 and recess 22 is at the left of said members to position the work holding jaw 15 concentrically with the other working holding jaws all in the same relative positions, the scroll is operated to close the jaws toward the work. When the other three jaws contact the work it is seen that the jaw 15 at the left of Figure 2 does not quite touch the work. It can be moved no closer to the work because of the abutting shoulders of the lug and recess 21 and 22. Therefore, all of the other three screws 20 are operated to move all of the other three carriers 19 to their opposite positions with the shoulders between the recesses and lugs contacting at the right, as seen at the right in Figure 2. The scroll now being operated to close the jaws upon the work and the jaw at the left in Figure 2 not quite touching the work, as in the case just above related, the screw 20 may be operated to close said jaw against the work by reason of the space which exists between the lug and recess at the left of said element.

In a similar example, with the shoulders referred to abutting at the right, in Figure 2, and the jaws being moved against the work by the operation of the scroll, it is found that the jaw in question touches the work before the other three jaws the said jaw cannot be moved back because of the contacting shoulders at the right. Therefore, all of the jaws being moved by their respective screws 20 to the other limit of their play to insure their concentricity, the jaw in question may now be moved back far enough to enable all of the jaws to be simultaneously moved up to the work by the operation of the scroll and the jaw in question may then be positioned to contact the work by the operation of its screw 20.

It will now be seen that by providing two extreme limits for positioning all of the jaws in the same relative concentric position the capacity of the chuck to a maximum degree may be obtained.

Each screw 20 has an annular groove 23 in which a retaining lug 24 from a screw carrier 19 projects, as shown in Fig. 2, said screws being thus held against lengthwise movement independently of the screw carriers. A head 25 is thus formed on the inner end of each of the adjusting screws 20, which heads close the openings between the base and the screw carrier at the inner ends of said openings, and prevents the entrance of dirt or chips into said openings. Each master jaw is cut away as at 26 to provide a clearance for the screw thread which runs out at this point, as well as the opposite end, this construction avoiding any chance of mutilation of the thread by engagement of its end with a solid piece of metal. The interengaging shoulders on each screw carrier and companion master jaw will stop the movement of the master jaw before the thread thereon engages the shoulder on the adjusting screw as shown in Fig. 2.

It is obvious that the lugs and recesses 21—22 may be reversed from the position shown in Fig. 2 without departing from the spirit and intent of the invention. It is also obvious that while each of the master jaws 14 and its companion work holding jaw 15 are shown herein as separate members, they may be formed as a single piece, in which event the master jaw element would become the work holding jaw in direct engagement with the adjusting screw 20, the jaws 15 being formed separately from the master jaws merely as a matter of convenience and as is common to structures of this type.

In the modification shown in Figs. 3 and 4 limitation of movement in one direction only is provided to obtain concentricity, a lug 27 on the master jaw 14 engaging a groove 28 running out at the end of the screw carrier 19, contact of said lug with the end of the groove limiting the movement when the parts are concentrically positioned. In the structure shown in Fig. 5 a shoulder 29 on the master jaw 14 engages a flange 30 on the adjusting screw 20 to limit movement of a master jaw when the jaw thereon is concentrically positioned.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. A chuck comprising a chuck body, a master jaw member movable radially on a screw carrier member on said body, a screw carrier member movable radially on said body, interengaging shouldered elements on said members extending longitudinally of said members and comprising a recess in one member having opposite end abutment shoulders and a lug on the other member extending into said recess and selectively movable into engagement with said abutment shoulders, said end abutment shoulders being positioned to determine the concentricity of a plurality of said master jaw members all at the same distance from the axis of the chuck body, an adjusting screw engaged with one of said members to effect independent relative movement of said members, and means for effecting radial movement of said screw carrier member and the member supported thereon.

2. A chuck comprising a chuck body, a master jaw member movable radially on said body, a screw carrier member movable radially on said body, a recess in one of said members and a lug on the other of said members to enter said recess, said recess providing end abutment shoulders for coaction with said lug to positively determine the extent of movement of one of said members with respect to the other, at each end of the path of movement of said member, an adjusting screw engaged with one of said members to effect said independent movement, and means for effecting radial movement of said screw carrier member and the members supported thereon.

3. A chuck comprising a chuck body, a master jaw member movable radially on said body, a screw carrier member movable radially on said body, interengaging shouldered elements on said members to positively determine the extent of movement of one of said members independently of the other, at each end of the path of movement of said member, an adjusting screw engaged with threads on one of said members to effect said independent movement, an annular groove formed in said screw, a lug projecting from one of said members into said groove, a head formed on the end of said screw and fitting within a recess to close the opening into the hole containing the screw, and means for effecting radial movement of said screw carrier member and the members supported thereon.

HARRY E. SLOAN.
HARRY E. SLOAN, Jr.
GEORGE A. HIGHBERG.